(12) United States Patent
Wen

(10) Patent No.: US 12,225,145 B2
(45) Date of Patent: Feb. 11, 2025

(54) MOBILE TERMINAL AND CONTROL METHOD THEREFOR

(71) Applicant: ZTE CORPORATION, Guangdong (CN)

(72) Inventor: Chenguang Wen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 581 days.

(21) Appl. No.: 17/604,751

(22) PCT Filed: Mar. 25, 2020

(86) PCT No.: PCT/CN2020/081241
§ 371 (c)(1),
(2) Date: Oct. 18, 2021

(87) PCT Pub. No.: WO2020/258950
PCT Pub. Date: Dec. 30, 2020

(65) Prior Publication Data
US 2022/0263929 A1 Aug. 18, 2022

(30) Foreign Application Priority Data

Jun. 24, 2019 (CN) .......................... 201910550192.6

(51) Int. Cl.
*H04M 1/02* (2006.01)
*G06F 1/16* (2006.01)
(Continued)

(52) U.S. Cl.
CPC ........ *H04M 1/0216* (2013.01); *G06F 1/1652* (2013.01); *G06F 1/1677* (2013.01);
(Continued)

(58) Field of Classification Search
CPC H04M 1/0216; G06F 3/04186; G06F 1/1652; G06F 1/1677; G06F 3/0412; G06F 3/0488; G06F 2203/04102
(Continued)

(56) References Cited

U.S. PATENT DOCUMENTS

| | | | |
|---|---|---|---|
| 10,528,312 B2 * | 1/2020 | Reeves | G06F 1/1677 |
| 11,595,510 B2 * | 2/2023 | Noh | G06F 1/1637 |

(Continued)

FOREIGN PATENT DOCUMENTS

| | | |
|---|---|---|
| CN | 101882042 A | 11/2010 |
| CN | 104428739 A | 3/2015 |

(Continued)

OTHER PUBLICATIONS

ZTE Corporation, Extended European Search Report, EP 20832374.1, Apr. 7, 2022, 18pgs.
(Continued)

*Primary Examiner* — April G Gonzales
(74) *Attorney, Agent, or Firm* — Dority & Manning, P.A.

(57) ABSTRACT

A control method for a mobile terminal is disclosed, applicable to a mobile terminal including at least one screen, where the screen has at least one bending part or is foldable to form at least one bending part. The control method includes: detecting a holding gesture on the mobile terminal; and setting a first effective touch region and a first ineffective touch region corresponding to the holding gesture on the bending part.

18 Claims, 9 Drawing Sheets

Detect a holding gesture on the mobile terminal — S101

Set a first effective touch region and a first ineffective touch region corresponding to the holding gesture on the bending part of the screen of the mobile terminal — S102

(51) Int. Cl.
*G06F 3/041* (2006.01)
*G06F 3/0488* (2022.01)

(52) U.S. Cl.
CPC ........ *G06F 3/0412* (2013.01); *G06F 3/04186* (2019.05); *G06F 3/0488* (2013.01); *G06F 2203/04102* (2013.01); *H04M 2201/38* (2013.01)

(58) Field of Classification Search
USPC ...................................... 455/575.3
See application file for complete search history.

(56) References Cited

U.S. PATENT DOCUMENTS

| | | | | |
|---|---|---|---|---|
| 11,782,595 B2* | 10/2023 | Ryu | .................... | G06F 3/03545 |
| | | | | 345/156 |
| 2014/0285450 A1* | 9/2014 | Cho | ...................... | G06F 1/1643 |
| | | | | 345/173 |
| 2014/0375660 A1* | 12/2014 | Tamaki | ................. | G06F 1/1643 |
| | | | | 345/522 |
| 2015/0015513 A1* | 1/2015 | Kwak | ................. | G06F 3/04886 |
| | | | | 345/173 |
| 2015/0020035 A1* | 1/2015 | Liang | ................. | G06F 3/04883 |
| | | | | 715/863 |
| 2015/0103023 A1* | 4/2015 | Iwaki | .................... | G06F 1/1652 |
| | | | | 345/173 |
| 2016/0062515 A1* | 3/2016 | Bae | ........................ | G06F 3/044 |
| | | | | 345/174 |
| 2016/0187994 A1* | 6/2016 | La | ........................... | G06F 3/147 |
| | | | | 345/619 |
| 2016/0313966 A1* | 10/2016 | Jeong | .................. | G06F 3/04847 |
| 2017/0045996 A1* | 2/2017 | Ka | ......................... | G09G 3/035 |
| 2018/0107339 A1* | 4/2018 | Dai | ....................... | G06F 3/0488 |
| 2019/0026008 A1* | 1/2019 | Yeo | ...................... | G06F 3/0484 |
| 2019/0138179 A1* | 5/2019 | Xia | ....................... | G06F 1/1643 |
| 2020/0159293 A1* | 5/2020 | Seibert | .................. | G06F 1/1643 |

FOREIGN PATENT DOCUMENTS

| | | |
|---|---|---|
| CN | 104571919 A | 4/2015 |
| CN | 105824535 A | 8/2016 |
| CN | 106445238 A | 2/2017 |
| CN | 106648427 A | 5/2017 |
| CN | 108459797 A | 8/2018 |
| CN | 109683778 A | 4/2019 |
| CN | 109819102 A | 5/2019 |
| EP | 3091426 A1 | 11/2016 |
| WO | 2018120084 A1 | 7/2018 |

OTHER PUBLICATIONS

ZTE Corporation, International Search Report, PCT/CN2020/081241, Jun. 29, 2020, 6 pgs.
Chinese Office Action (w/ English translation) for corresponding Application No. 201910550192.6, dated Apr. 30, 2024, 20 pages.

* cited by examiner

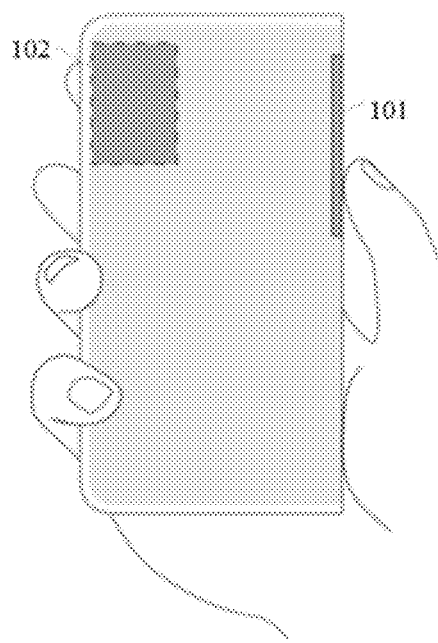 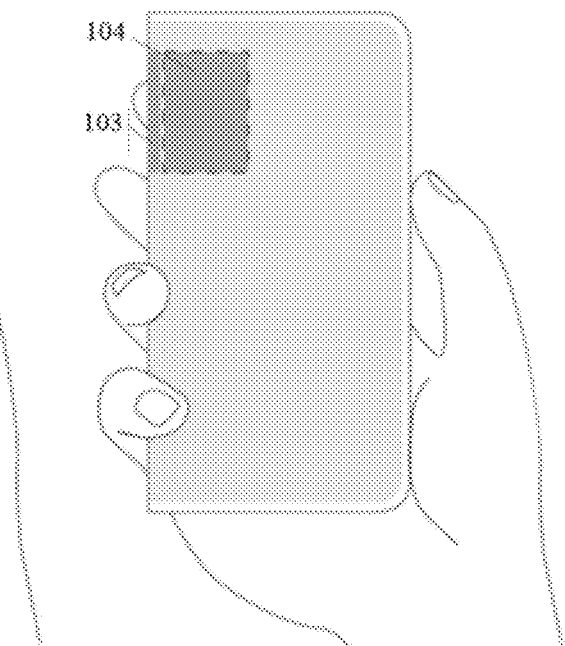
FIG. 9A　　　　　　　　FIG. 9B
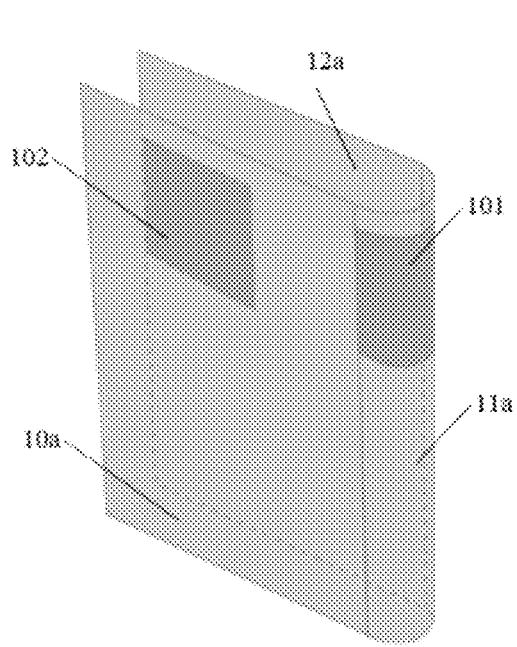 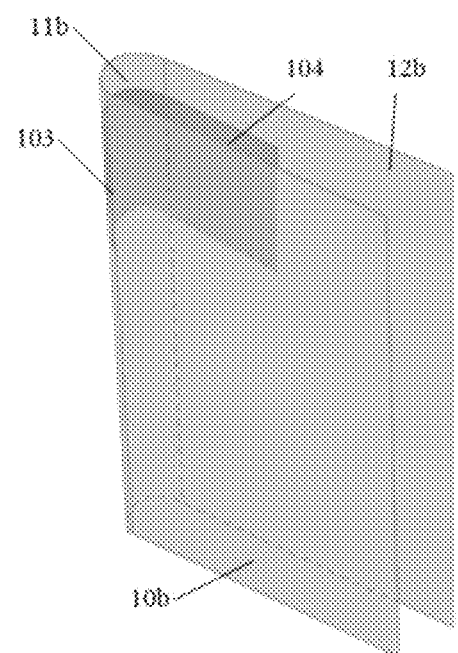
FIG. 10A　　　　　　　　FIG. 10B

MOBILE TERMINAL AND CONTROL METHOD THEREFOR

CROSS REFERENCE TO RELATED APPLICATIONS

The present application is a United States National Stage Application filed under 35 U.S.C. § 371 of PCT Patent Application Serial No. PCT/CN2020/081241, entitled "Mobile Terminal Control Method and Mobile Terminal," filed Mar. 25, 2020, which claims priority to Chinese patent application No. 201910550192.6, entitled "Mobile Terminal Control Method and Mobile Terminal," filed on Jun. 24, 2019, each of which is incorporated by reference in its entirety.

TECHNICAL FIELD

Embodiments of the present disclosure relate to, but are not limited to, the field of communication technology, and particularly to a mobile terminal and a control method therefor.

BACKGROUND

With the rapid development of science and technology, appearances of mobile electronic devices have undergone tremendous changes. Among them, a foldable screen and a curved screen have attracted much attention for their unique characteristics and huge potential. Compared with a traditional screen, the foldable screen and the curved screen can provide a user with a new interactive method based on a bendable characteristic, so as to meet the user's more needs for the electronic device.

SUMMARY

The present disclosure provides a mobile terminal and a control method therefor.

In one aspect, the present disclosure provides a control method for a mobile terminal, applicable to a mobile terminal including at least one screen, where the screen has at least one bending part or is foldable to form at least one bending part. The control method includes: detecting a holding gesture on the mobile terminal; and setting a first effective touch region and a first ineffective touch region on the bending part, the first effective touch region and the first ineffective touch region corresponding to the holding gesture.

In another aspect, the present disclosure provides a mobile terminal, including: at least one screen, a memory, and a processor; where the screen has at least one bending part, or the screen is foldable to form at least one bending part; the memory is configured to store a computer program that, when executed by the processor, causes the processor to implement the above-mentioned control method.

In still another aspect, the present disclosure provides a computer-readable storage medium storing a computer program that, when executed by a processor, causes the processor to implement the above-mentioned control method.

Other features and advantages of the present disclosure are described in the following specification, and partly become obvious from the specification, or understood by implementing the present disclosure. The purpose and other advantages of the present disclosure may be realized and obtained through a structure specifically pointed out in the specification, claims and drawings.

BRIEF DESCRIPTION OF THE DRAWINGS

The accompanying drawings are used to provide a further understanding of the technical solution of the present disclosure, and constitute a part of the specification. Together with embodiments of the present disclosure, the accompanying drawings are used to explain the technical solution of the present disclosure, and do not constitute a limitation to the technical solution of the present disclosure.

FIG. 9A and FIG. 9B are schematic diagrams of plane arrangements of an effective touch region and an ineffective touch region in an exemplary embodiment of the present disclosure.

FIG. 10A and FIG. 10B are three-dimensional perspective diagrams corresponding to the schematic diagrams of the plane arrangements shown in FIG. 9A and FIG. 9B.

DETAILED DESCRIPTION

In order to make the purpose, the technical solution, and the advantages of the present disclosure clearer, embodiments of the present disclosure will be described in detail below with reference to the accompanying drawings. It should be noted that the embodiments in the present disclosure and features in the embodiments may be combined with each other arbitrarily in a condition without conflict.

The steps shown in the flowcharts of the accompanying drawings may be performed in a computer system storing a set of computer-executable instructions. And, although a logical sequence is shown in the flowcharts, in some cases, the steps shown or described may be performed in a different order other than that described herein.

An embodiment of the present disclosure provides a control method for a mobile terminal, applicable to a mobile terminal including at least one screen, where the screen has at least one bending part or the screen is foldable to form at least one bending part. For example, the mobile terminal may include one screen and the screen has one or more bending parts, or the mobile terminal may include one screen and the screen is foldable to form one or more bending parts, or the mobile terminal may include two screens, and one of the two screens is foldable to form one or more bending parts. Herein, the bending part may be an incomplete plane region, or may be one or more edges of one or more plane parts, or may be a connection region or a transition region of two or more of the plane parts. However, the present disclosure is not limited to this.

The mobile terminal in this embodiment may be a single-screen terminal, a dual-screen terminal, or a multi-screen terminal. The mobile terminal in this embodiment may include, but is not limited to, a smart phone, a wearable device, a tablet computer, and the like. However, the present disclosure is not limited to this.

Figure 2:
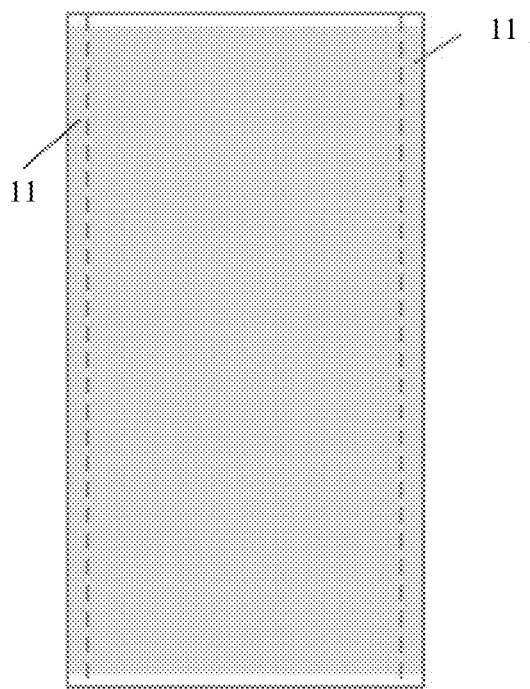
FIG. 2 is a front view of a non-foldable mobile terminal.
Figure 3:
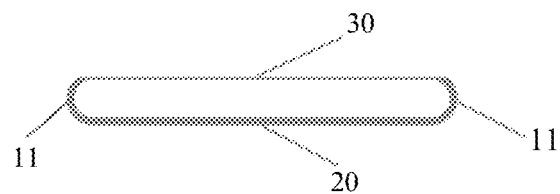
FIG. 3 is a top view of the non-foldable mobile terminal shown in FIG. 2.

In an example, the mobile terminal in this embodiment may include a non-foldable screen. The screen may include one plane part and a bending part extending from the plane part and bended downward along a width or length direction of the plane part. The bending part may be located on a side wall of the mobile terminal. Taking the mobile terminal which is a smart phone as an example, the bending part may be located on a side wall in a length or width direction of the mobile phone and the bending part located on the side wall may have a curved surface. Since as a part of the entire screen, the bending part may be used for display and operation. In this example, the bending part of the screen is fixed and does not change. FIG. 2 is a front view of a non-foldable mobile terminal, and FIG. 3 is a top view of the non-foldable mobile terminal shown in FIG. 2. As shown in FIG. 2 and FIG. 3, the mobile terminal may include a terminal back 30 and a screen. The screen includes a plane part 20 and two bending parts 11 extending from both length sides of the plane part 20 and bended along a length direction of the plane part 20. However, the present disclosure is not limited to this. In other embodiments, a number of the bending parts may be one or three or four.

In another example, the mobile terminal in this embodiment may include a foldable screen or a flexible screen, and the foldable screen or the flexible screen has a feature of being bendable at one or more positions. Taking the foldable screen as an example, after being bent outward at one position at a certain angle, the foldable screen may be divided into two screen units orientated oppositely for display, and a curved surface formed at the folding position of the foldable screen may be called the bending part. One bending (or folding) of the foldable screen or the flexible screen may form one bending part accordingly. Since as a part of the foldable screen, the bending part may also be used for display and operation. In this example, the bending part of the screen is not fixed, but is formed after the screen is bent (or folded).

Figure 1:
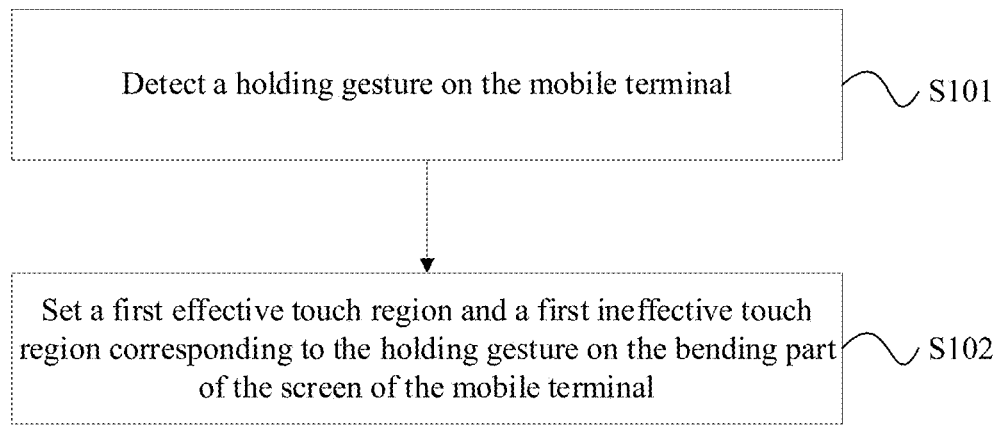
FIG. 1 is a flowchart of a control method for a mobile terminal according to an embodiment of the present disclosure.

FIG. 1 is a flowchart of a control method for a mobile terminal according to an embodiment of the present disclosure. As shown in FIG. 1, the control method provided in this embodiment, applicable to the above-mentioned mobile terminal, includes steps as follows.

In S101, a holding gesture on the mobile terminal is detected.

In S102, a first effective touch region and a first ineffective touch region corresponding to the holding gesture are set on a bending part of a screen of a mobile terminal.

In an exemplary embodiment, after S102, the control method in this embodiment may further include: when a touch operation acting in the first ineffective touch region is received, the touch operation in the first ineffective touch region is ignored by being not responded to; or when a touch operation acting in the first effective touch region is received, the touch operation in the first effective touch region is responded to, with a processing corresponding to the touch operation is performed.

In an example, the touch operation in the first effective touch region may include: an up and down sliding operation, a single-click operation, and a double-click operation. For example, when the mobile terminal is displaying a page with text or a combination of graphics and text, the up and down sliding operation in the first effective touch region may realize page sliding such as sliding the page upward or downward. When the mobile terminal is in a picture viewing mode, the up and down sliding operation in the first effective touch region may realize picture switching. For example, sliding up in the first effective touch region may switch to a previous picture correspondingly, and sliding down in the first effective touch region may switch to a next picture correspondingly. When the mobile terminal is in a picture searching mode, the double-click operation in the first effective touch region may zoom in and out on the picture, for example, zoom in or out on the picture being displayed to a certain scale. However, the present disclosure is not limited to this. In actual applications, the touch operations in the first effective touch region and the corresponding response strategy may be set according to actual needs.

In an exemplary embodiment, before S101, the control method in this embodiment may further include: a folding angle of the screen of the mobile terminal is detected; when the folding angle satisfies an angle setting condition, it is determined that the screen has been folded to form the bending part. In this exemplary embodiment, for a case where the bending part on the screen of the mobile terminal is not fixed (the screen is the foldable screen or the flexible screen), before S101, it is necessary to determine whether the screen forms the bending part. After the bending part is formed on the screen, processing on the bending part is performed. Exemplarily, the screen of the mobile terminal may include at least a first screen unit and a second screen unit. Correspondingly, the step that the folding angle of the screen of the mobile terminal is detected may include: an included angle between the first screen unit and the second screen unit is detected.

In an exemplary embodiment, S101 may include: a first touch parameter of a hand and the bending part of the screen is detected, and the holding gesture on the mobile terminal according to the first touch parameter is recognized; or, a second touch parameter of the hand and the screen is detected, and the holding gesture on the mobile terminal according to the second touch parameter is recognized.

In an exemplary embodiment, the first touch parameter may include: a number of touch points on the bending part and an area of each of the touch points.

Herein, the step that the holding gesture on the mobile terminal according to the first touch parameter is recognized includes: when the number of the touch points on the bending part is greater than zero and less than or equal to two, and the area of one of the touch points is greater than an area threshold value, it is determined that the bending part is held on an inner side of a palm; and when the number of the touch points on the bending part is greater than two and less than or equal to four, and the area of each of the touch points is less than or equal to the area threshold value, it is determined that the bending part is held on a fingertip side of a finger.

In an exemplary embodiment, after S101, the control method provided in this embodiment may further include: a hand shape model is established according to the second touch parameter; a hand shape feature is estimated according to the hand shape model.

Correspondingly, S102 may include: a first effective touch region and a first ineffective touch region corresponding to the holding gesture and matching the hand shape feature are set on the bending part. Herein, the second touch parameter may include: a contact region, a contact area, a contact force, and the like. However, the present disclosure is not limited to this.

In this exemplary embodiment, the first effective touch region and the first ineffective touch region are set based on the holding gesture and the hand shape model, which may achieve personalized matching of the hand shapes of different users, so as to meet the usage needs and characteristics of different users.

In an exemplary embodiment, after S101, the control method in this embodiment further includes: a second effective touch region and a second ineffective touch region corresponding to the holding gesture are set on a screen region facing a palm of a hand. In this exemplary embodiment, after the screen is folded, an interface display may be on a screen region on a side facing the user, while the second effective touch region supporting operation control of the display interface may be set in a screen region facing away from the user (that is, the screen region facing the palm of the hand holding the mobile terminal), so as to provide the user with a new interactive mode, make it convenient for the user to use, and improve the user's experience.

An embodiment of the present disclosure provides a control method for a mobile terminal, which may support providing a less intense and more refined operation method on the mobile terminal, thereby improving user experience while preventing false touches.

Figure 4:
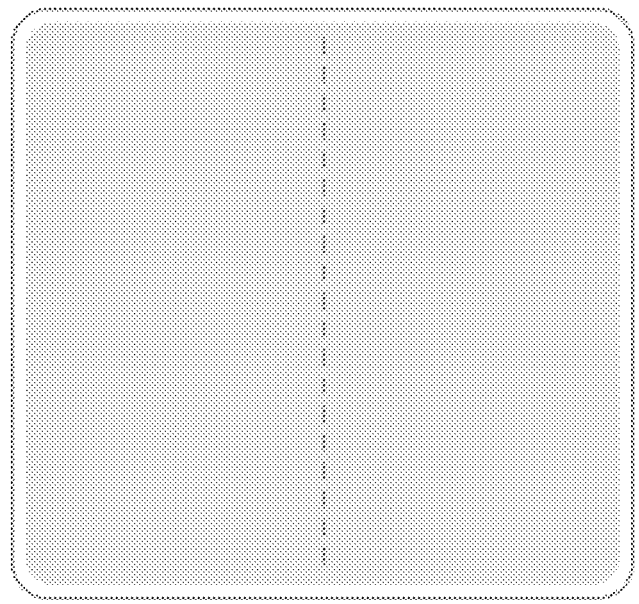
FIG. 4 is a schematic diagram of a foldable screen of a mobile terminal with the foldable screen unfolded.
Figure 5:
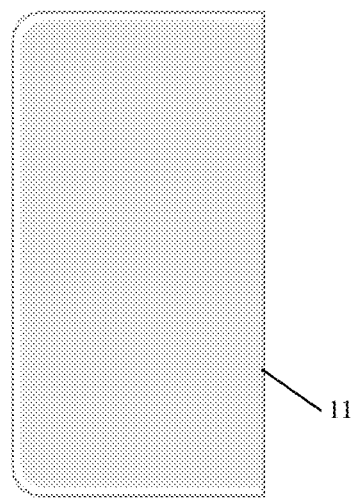
FIG. 5 is a front view of the foldable screen shown in FIG. 4 in a fully folded state.

Hereinafter, a smart phone including a foldable screen or a flexible screen (hereinafter referred to as a foldable screen mobile phone) as shown in FIG. 4 is taken as an example to illustrate the control method provided in the embodiment of the present disclosure. In FIG. 4, the foldable screen of the foldable screen mobile phone is in an unfolded state, and faces upward. Herein, in terms of folding modes of the foldable screen, two folding modes are provided including inward folding and outward folding; in terms of a number of screen units after folded, double-screen or triple-screen is formed after folded. In this example, the foldable screen may be folded along a rotating shaft (a broken line shown in FIG. 4) to form the double-screen. FIG. 5 shows a front view of the foldable screen mobile phone in a fully folded state. In this example, the foldable screen mobile phone is folded outward, and a whole screen is divided into two screen units for display after folded, that is, the two screen units after the folded display information content. It should be noted that the control method provided in this embodiment of the present disclosure is also applicable to a foldable screen that is folded to form the triple-screen or the multi-screen, and also applicable to a flexible screen that forms a bending part after bending or folding a part of the screen.

Figure 6:
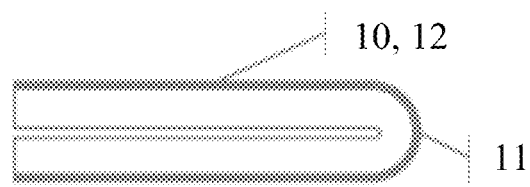
FIG. 6 is a side view of the foldable screen shown in FIG. 4 in the fully folded state.

Based on the unfolded state shown in FIG. 4, the screen unit on a right side may be rotated 180 degrees clockwise along the rotating shaft (the broken line in FIG. 4) to reach the fully folded state shown in FIG. 5 and FIG. 6. At this time, a bending part 11 is on the right side. FIG. 6 is a side view of the foldable screen mobile phone in the fully folded state. Herein, a curved surface connected between two parallel upper and lower screen units 10 and 12 is the bending part 11.

Figure 7A:
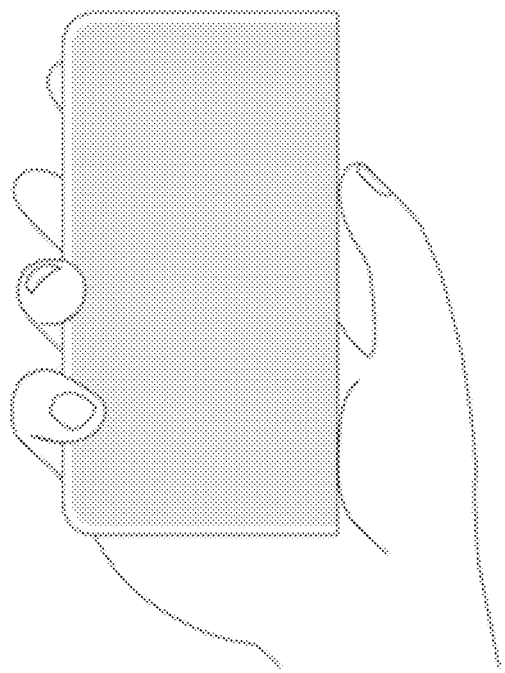
FIG. 7A and FIG. 7B are schematic diagrams of holding gestures on the mobile terminal shown in FIG. 5 in the fully folded state.
Figure 7B:
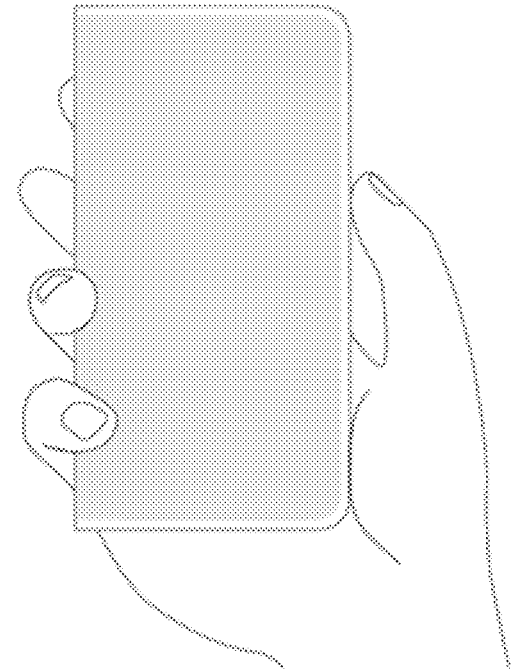

FIG. 7A and FIG. 7B are schematic diagrams of holding gestures on the foldable screen mobile phone shown in FIG. 5 and FIG. 6 in the fully folded state. With the foldable screen mobile phone in the fully folded state shown in FIG. 5 and FIG. 6, the user may usually hold the mobile phone with one hand. As shown in FIG. 7A, the bending part is held on an inner side of a palm. At this time, the palm and thumb may touch the bending part. As shown in FIG. 7B, the bending part is held on a fingertip side of fingers. At this time, the other four fingers except the thumb may touch the bending part.

Usually the user may use the thumb and index finger to operate on the screen of the mobile phone, and with the holding gestures on the mobile phone as shown in FIG. 7, the thumb or index finger may easily touch the bending part, such holding gestures are exactly how the phone is used normally, so as to support the operability of defining a new interactive mode on the bending part in an operation mode and use scene.

Figure 8:
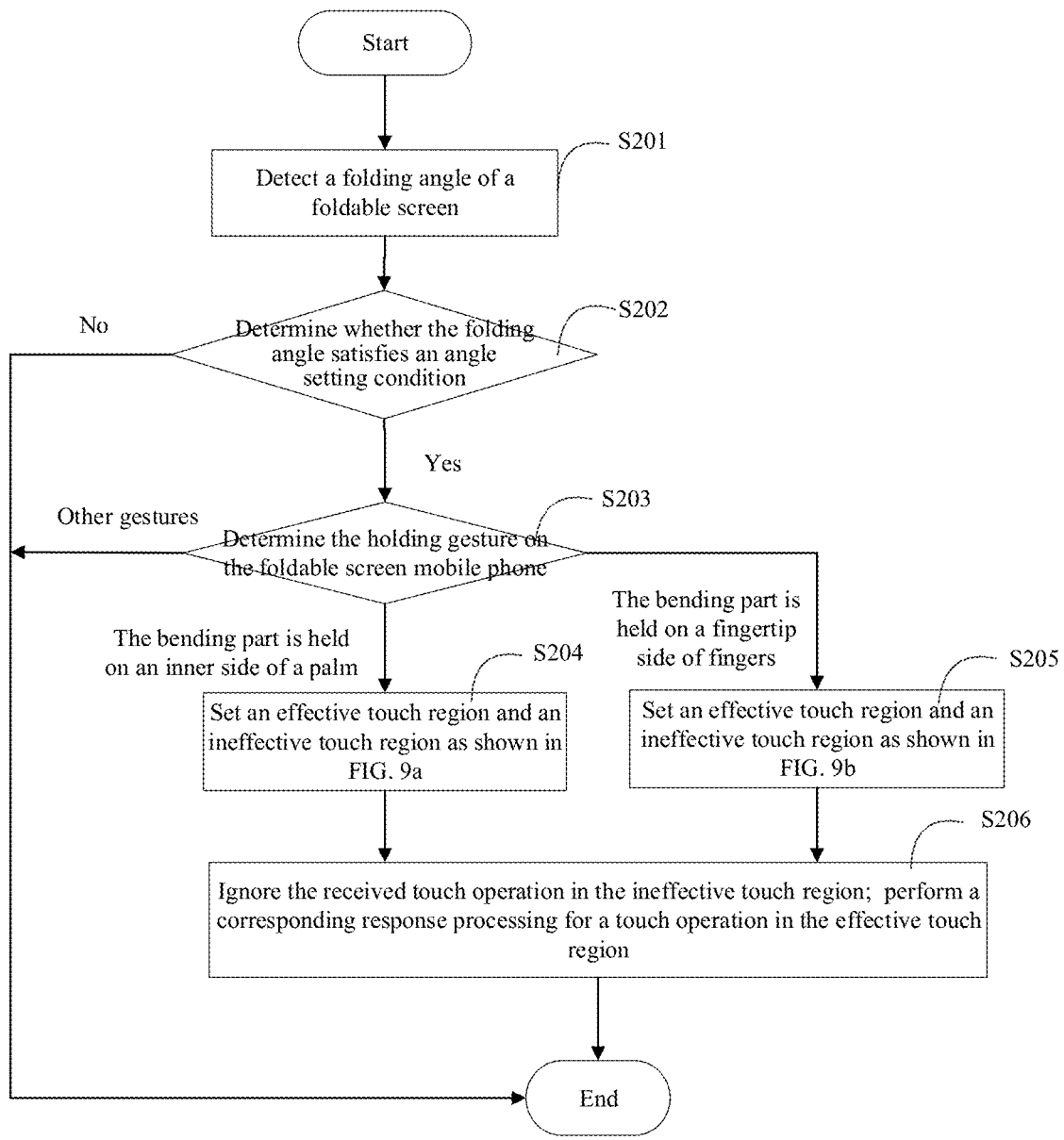
FIG. 8 is a schematic diagram of an exemplary implementation of a control method according to an embodiment of the present disclosure.

FIG. 8 is a schematic diagram of an exemplary implementation of a control method for a mobile terminal according to an embodiment of the present disclosure. This exemplary embodiment describes a method for controlling the foldable screen mobile phone shown in FIG. 4 to FIG. 7. As shown in FIG. 8, this exemplary embodiment includes the following processes.

In S201, a folding angle of the foldable screen is detected.

In this example, as shown in FIG. 4 and FIG. 5, the foldable screen may include a first screen unit and a second screen unit, and the folding angle of the foldable screen refers to an included angle between the first screen unit and the second screen unit. The first screen unit and the second screen unit may be relatively folded along a rotating shaft, so that the included angle between the first screen unit and the second screen unit is adjustable.

In S202, whether the folding angle satisfies an angle setting condition is determined.

For example, whether the included angle between the first screen unit and the second screen unit is greater than or equal to a preset angle threshold value may be determined. If the included angle is greater than or equal to the angle threshold value, S203 is performed; otherwise, the processing ends.

In S203, the holding gesture on the foldable screen mobile phone is determined.

In this example, the holding gesture on the foldable screen mobile phone may be determined based on a number of touch points and a contact area of each touch point of the hand on the bending part. In this example, the holding gestures may be classified into the following three types: the bending part is held on the inner side of the palm, the bending part is held on the fingertip side of the fingers, and other gestures.

Figure 11:
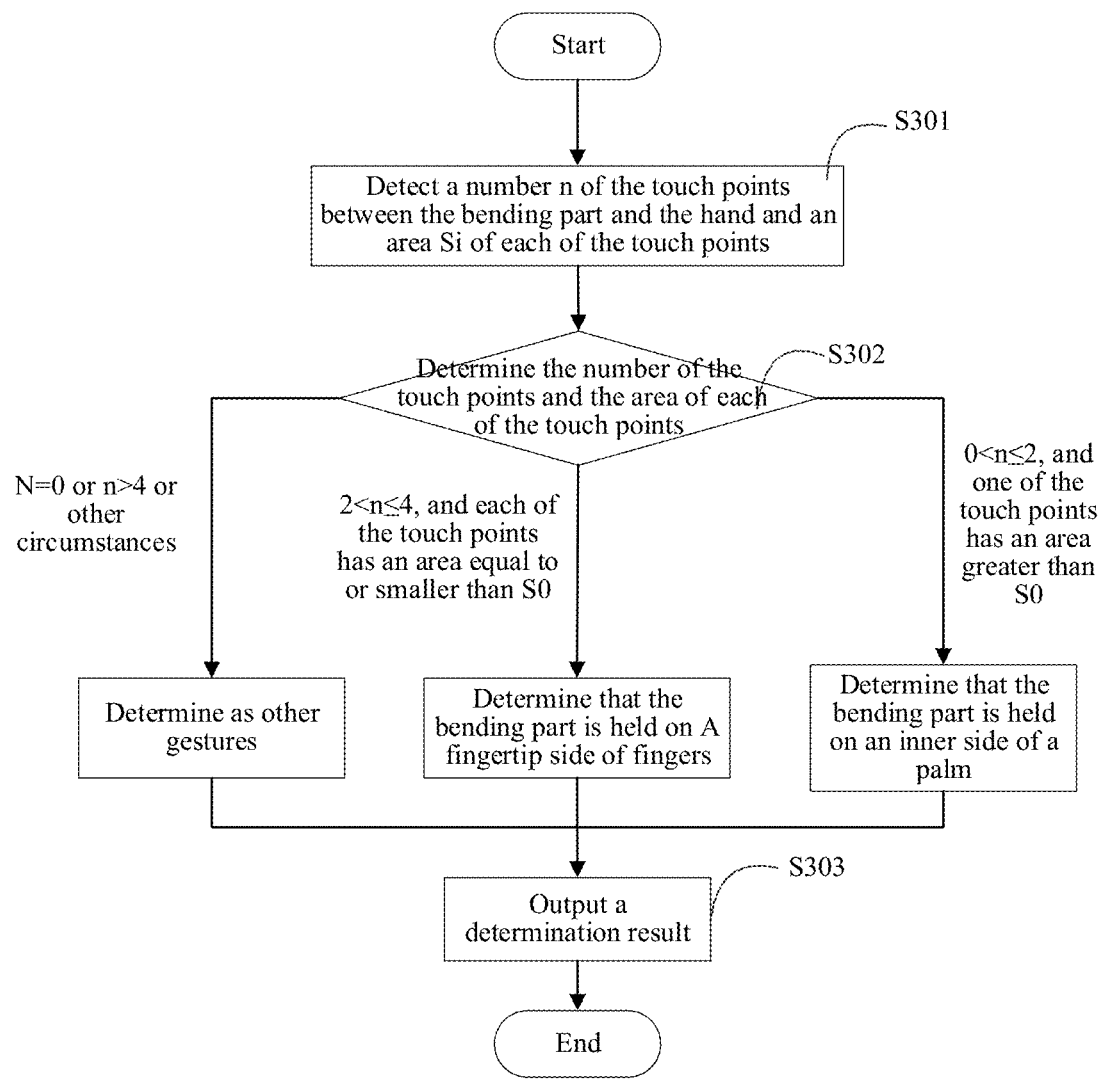
FIG. 11 is a schematic diagram of a process of recognition on a holding gesture in an exemplary embodiment of the present disclosure.

FIG. 11 is a schematic diagram of a process of recognition on the holding gesture in this exemplary embodiment. As shown in FIG. 11, the exemplary process of recognition on the holding gesture includes the following steps.

In S301, a number n (n is an integer) of the touch points between the bending part and the hand and an area Si (S>0) of each of the touch points are detected. Herein, the areas of the n touch points may be expressed as S1, S2, ..., Sn, respectively. Herein, a maximum contact area between a finger and the mobile phone screen under a normal condition may be defined as S0.

In S302, determination and recognition is performed according to the number of the touch points and the area of each of the touch points.

Figure 12A:
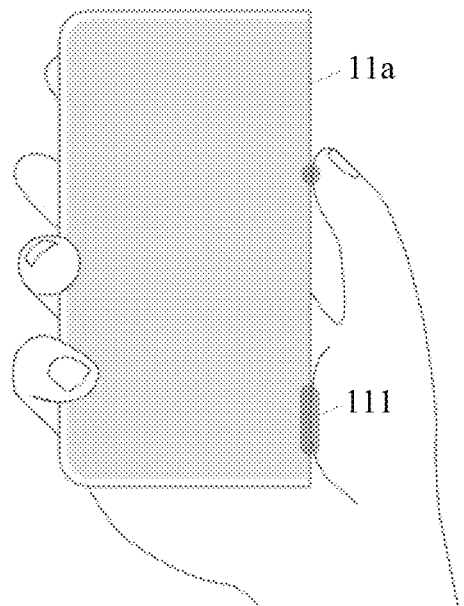
FIG. 12A and FIG. 12B are schematic diagrams of a holding gesture in an exemplary embodiment of the present disclosure.
Figure 12B:
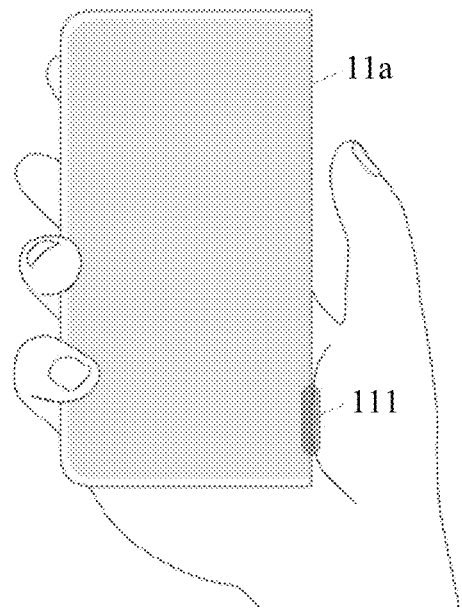

Herein, if $0<n \leqslant 2$, and one of the touch points has an area of Si>S0, it is considered that the touch point with the larger contact area is a touch point between the palm and the bending part, and a current gesture may be determined as: the bending part is held on the inner side of the palm (as shown in FIG. 12A and FIG. 12B, where FIG. 12A illustrates a case where the bending part 11a is held on the inner side of the palm and the thumb touches the bending part 11a, FIG. 12B illustrates a case where the bending part 11a is held on the inner side of the palm and the thumb does not touch the bending part 11a, with the touch point(s) 111 shown in the figures).

Figure 13A:
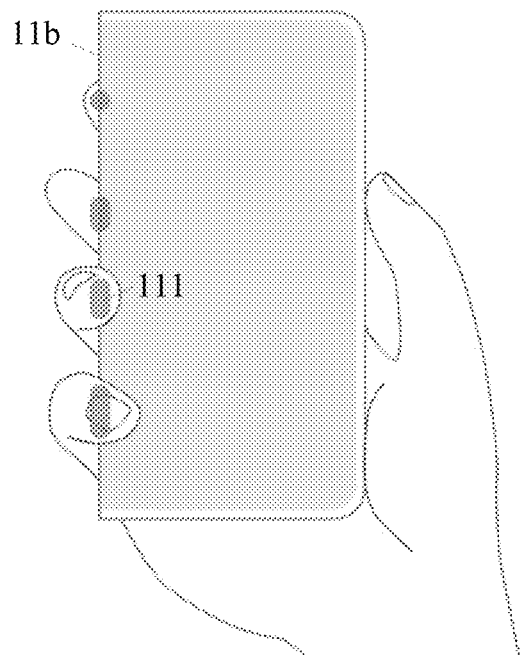
FIG. 13A and FIG. 13B are schematic diagrams of another holding gesture in an exemplary embodiment of the present disclosure.
Figure 13B:
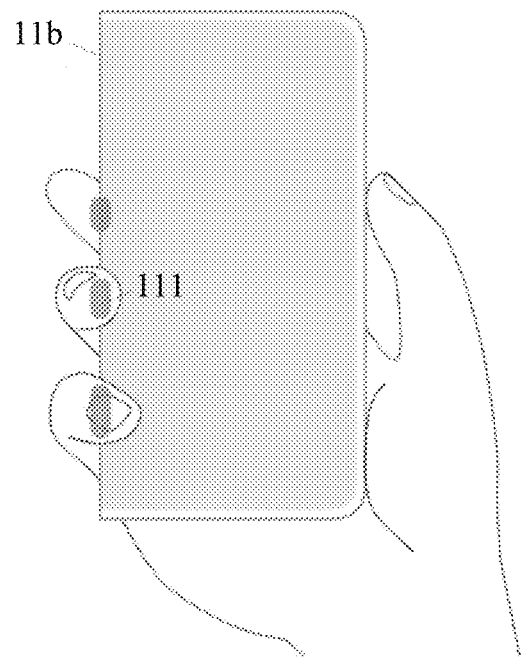

If $2<n \leqslant 4$, and the area of each of the touch points is less than or equal to S0, a current gesture may be determined as: the bending part is held on the fingertip side of the finger (as shown in FIG. 13A and FIG. 13B, where FIG. 13A illustrates a case where the bending part 11b is held on the fingertip side of the finger, and the index finger touches the bending part 11b, FIG. 13B illustrates a case where the bending part 11b is held on the fingertip side of the finger, and the index finger does not touch the bending part 11b, with the touch points 111 shown in the figures).

If n=0 or n>4 or other cases other than the aforementioned cases occur, the current gesture is determined as: other gestures.

In S303, a determination result is output.

In this example, after the determination result are obtained through the process of recognition on the holding gesture shown in FIG. 11, a corresponding processing is performed according to the determination result. Herein, if the current gesture is determined as other gestures, the processing ends; if the current gesture is determined as one of the holding gestures as shown in FIG. 12A and FIG. 12B, S204 is performed; if the current gesture is determined as one of the holding gestures shown in FIG. 13A and FIG. 13B, S205 is performed.

In S204, when the holding gesture on the foldable screen mobile phone is determined as: the bending part is held on the inner side of the palm, the effective touch region and the ineffective touch region may be set as shown in FIG. 9A and FIG. 10A. Herein, FIG. 9A shows a plan view of the effective touch region, and FIG. 10A is a three-dimensional perspective view corresponding to the plan view of FIG. 9A.

In this example, as shown in FIG. 10A, the foldable screen is divided into the following three parts after being folded: a first screen unit 10A, a bending part 11a, and a second screen unit 12a. When the bending part 11a is held on the inner side of the palm, the first screen unit 10a faces the user, and the second screen unit 12a faces away from the user and faces the palm of the user.

Referring to FIG. 9A and FIG. 10A, the effective touch region may include a first effective touch region 101 and a second effective touch region 102. The first effective touch region 101 is an upper middle region of the bending part 11a, that is, a touch region that is touchable by a thumb on the bending part. The second effective touch region 102 is a region that is touchable by an index finger on a back of the foldable screen mobile phone, that is, the touch region that is touchable by the index finger on the second screen unit 12a. In this example, the first effective touch region 101 may be touched by the thumb, and the second effective touch region 102 may be touched by the index finger.

In this example, the ineffective touch region may include: a first ineffective touch region and a second ineffective touch region. Herein, the first ineffective touch region is a region on the bending part 11a except the first effective touch region 101 and the second ineffective touch region is a region on the second screen unit 12a except the second effective touch region 102. With the ineffective touch region set, false touches during holding and operation of the mobile phone by the user may be effectively prevented.

Herein, the user interface may be displayed on the first screen unit 10a facing the user, and the user's touch operation on the first effective touch region 101 and the second effective touch region 102 may result in various manipulations on the displayed user interface. For example, when the first screen unit 10a displays a page with text or a combination of graphics and text, the up and down sliding operations received on the first effective touch region 101 and the second effective touch region 102 may realize sliding the page upward and downward.

In S205, when the holding gesture of the foldable screen mobile phone is determined as: the bending part is held on the fingertip side of the finger, the effective touch region and the ineffective touch region may be set as shown in FIG. 9B and FIG. 10B. Herein, FIG. 9B shows a plan view of the effective touch region, and FIG. 10B is a three-dimensional perspective view corresponding to the plan view of FIG. 9B.

In this example, as shown in FIG. 10B, the foldable screen is divided into the following three parts after being folded: a first screen unit 10b, a bending part 11b, and a second screen unit 12b. When the bending part 11b is held on the fingertip side of the finger, the first screen unit 10b faces the user, and the second screen unit 12b faces away from the user and faces the palm of the user.

Referring to FIG. 9B and FIG. 10B, the effective touch region may include a first effective touch region 103 and a second effective touch region 104. The first effective touch region 103 is an upper middle region of the bending part 11b, that is, a touch region that is touchable by an index finger on the bending part. The second effective touch region 104 is a region that is touchable by an index finger on a back of the foldable screen mobile phone, that is, the touch region that is touchable by the index finger on the second screen unit 12b. In this example, both the first effective touch region and the second effective touch region may be touched by the index finger. Therefore, as shown in FIG. 10B, the first effective touch region 103 and the second effective touch region 104 may be interconnected to facilitate a manipulation by the index finger. However, the present disclosure is not limited to this.

In this example, the ineffective touch region may include: a first ineffective touch region and a second ineffective touch region. Herein, the first ineffective touch region is a region on the bending part 11b except the first effective touch region 103 and the second ineffective touch region is a region on the second screen unit 12b except the second effective touch region 104.

Herein, the user interface may be displayed on the first screen unit 10b facing the user, and the user's touch operation on the first effective touch region 103 and the second effective touch region 104 may result in various manipulations on the displayed user interface.

In this example, setting positions of the effective touch region and the ineffective touch region corresponding to the respective holding gesture may be pre-defined. After the holding gesture is recognized, the effective touch region and the ineffective touch region may be set on the screen according to the pre-defined setting positions. However, the present disclosure is not limited to this. In other implementations, the position of the effective touch region may be determined according to the actual touch point of the thumb or index finger on the bending part.

In S206, an user touch operation received in the ineffective touch region is ignored; a corresponding response processing is performed for an user touch operation in the effective touch region.

Herein, for the effective touch region, various touch operations and corresponding rapid response processing may be defined. For example, for up and down sliding operations in the effective touch region: if the mobile phone is displaying a page with text or a combination of graphics and text, then page sliding such as sliding the page upward or downward may be realized; if the phone is in the picture viewing mode, switching to a previous/next picture may be realized. For single-click operation in the effective touch region, a certain item in the display interface of the phone may be viewed. For double-click operation in the effective touch region, zooming in and out on a picture may be realized in the picture viewing mode of the mobile phone, or, pausing/continuing to play music, etc. may be realized in a music playback interface. However, the present disclosure is not limited to this.

The control method for a foldable screen smart phone provided in this exemplary embodiment may define different response regions (i.e., effective touch region and ineffective touch region) on the foldable screen mobile phone according to the folding state of the mobile phone and the holding gesture thereon, so as to support convenient and flexible interaction with the user interface of the mobile phone while preventing misoperations. In this exemplary embodiment, with the effective touch region defined according to the holding gesture, quick manipulations on the user interface of the mobile phone may be realized only by the micro-operations of the thumb or the index finger. Compared with a conventional operation mode of the mobile phone, the operation is less intense and more refined, which brings a more convenient user experience. For example, it is convenient for the user to quickly turn pages, view the contents displayed on the screen, and the like.

Figure 14:
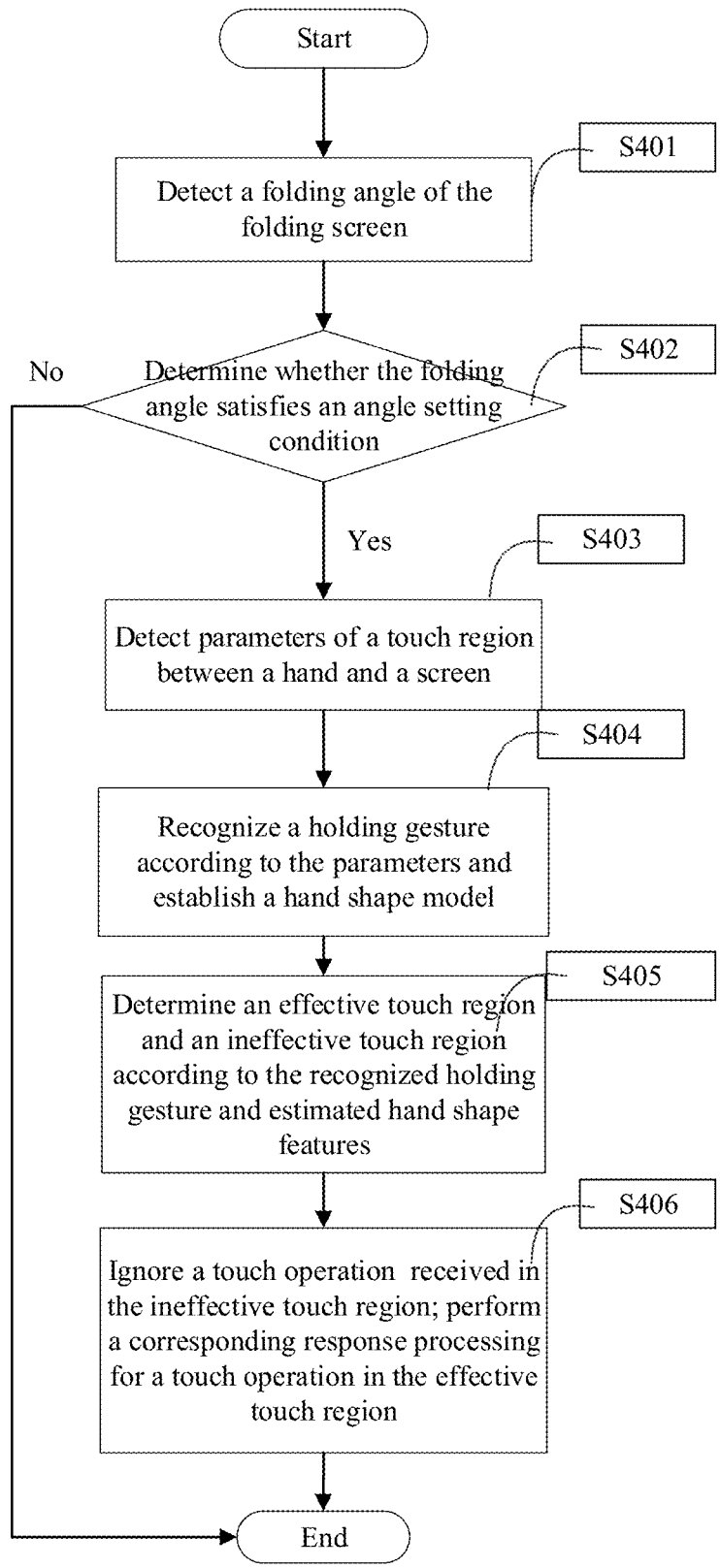
FIG. 14 is a schematic diagram of another exemplary implementation of a control method according to an embodiment of the present disclosure.

FIG. 14 is a schematic diagram of another exemplary implementation of the control method provided in an embodiment of the present disclosure. This exemplary embodiment describes a method for controlling the foldable screen mobile phone shown in FIG. 4 to FIG. 7. As shown in FIG. 14, the exemplary embodiment includes the following processes.

In S401, a folding angle of the foldable screen is detected.

In this example, as shown in FIG. 4 and FIG. 5, the foldable screen may include a first screen unit and a second screen unit, and the folding angle of the foldable screen refers to an included angle between the first screen unit and the second screen unit. The first screen unit and the second screen unit may be relatively folded along the rotating shaft, so that the included angle between the first screen unit and the second screen unit is adjustable.

In S402, whether the folding angle satisfies an angle setting condition is determined.

For example, whether the included angle between the first screen unit and the second screen unit is greater than or equal to a preset angle threshold value may be determined. If the included angle is greater than or equal to the angle threshold value, S403 is performed; otherwise, the processing ends.

In S403, parameters of a touch region between a hand and a back screen of the mobile phone and a bending part (corresponding to the above-mentioned second touch parameter, which may include parameters such as a contact region, a contact area, and a contact force). Herein, the second touch parameter may be comprehensively determined by multiple sensors provided under the mobile phone screen.

In S404, positions of a palm and fingers are recognized according to the second touch parameter, a holding gesture on the terminal is determined, and a hand shape model is automatically simulated.

The method of determining the holding gesture on the mobile phone may refer to a flow shown in FIG. 11. However, the present disclosure is not limited to this. In other implementations, in addition to determining the holding gesture as shown in FIG. 12A, FIG. 12B, FIG. 13A or FIG. 13B, a state that the mobile phone is held with one hand or both hands and the bending part is orientated upward and a state that the mobile phone is held with one hand or both hands and the bending part is orientated downward may also be determined according to the second touch parameter. Then, based on the determined holding gesture, the effective touch region and the ineffective touch region matching the holding gesture are determined.

In S405, a hand shape feature is estimated according to the hand shape model, and the effective touch region and the ineffective touch region are determined.

In this step, the hand shape feature may be estimated according to the hand shape model. Then, regions where it is easy for a thumb and an index finger to operate on the back screen (that is, a screen region facing the palm of the hand) and the bending part are calculated. Then, combining with the recognized holding gesture, the effective touch region and the ineffective touch region are determined.

In this example, how to set the effective touch region and the ineffective touch region may refer to FIG. 9A, FIG. 9B, FIG. 10A and FIG. 10B, which will not be repeated here.

The difference between this example and the example shown in FIG. 8 is that in this example, based on the hand shape feature estimated according to the holding gesture and the hand shape model, the effective touch region and the ineffective touch region that conform to the user's hand shape feature may be intelligently determined, so as to better meet user needs, achieve personalized adaptation, and improve user experience.

In S406, an user touch operation received in the ineffective touch region is ignored; a corresponding response processing is performed for an user touch operation in the effective touch region.

This step may refer to the description of S206, which will not be repeated here.

Figure 15:
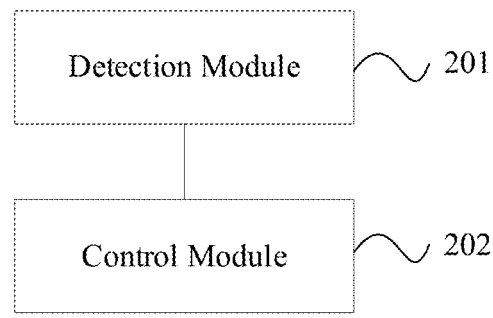
FIG. 15 is a schematic diagram of a control device of a mobile terminal according to an embodiment of the present disclosure.

FIG. 15 is a schematic diagram of a control device for a mobile terminal according to an embodiment of the present disclosure. The control device provided in this embodiment is applicable to a mobile terminal including at least one screen, where the screen has at least one bending part, or the screen is foldable to form at least one bending part.

As shown in FIG. 15, the control device provided in this embodiment may include: a detection module 201, configured to detect a holding gesture on the mobile terminal; a control module 202, configured to set a first effective touch region and a first ineffective touch region corresponding to the holding gesture on the bending part of the screen.

Herein, the control module 202 is further configured to ignore to a touch operation by not responding to the touch operation when the touch operation acting in the first ineffective touch region is received; and respond to a touch operation by performing a processing corresponding to the touch operation when the touch operation acting in the first effective touch region is received.

For the relevant description of the control device provided in this embodiment, reference may be made to the description of the foregoing method embodiments, which will not be repeated here.

In addition, an embodiment of the present disclosure also provides a mobile terminal, including at least one screen, a memory, and a processor. The screen has at least one bending part, or the screen is foldable to form at least one bending part. The memory is configured to store a computer program that, when executed by the processor, causes the processor to implement the steps of the control method provided in the foregoing embodiments.

Figure 16:
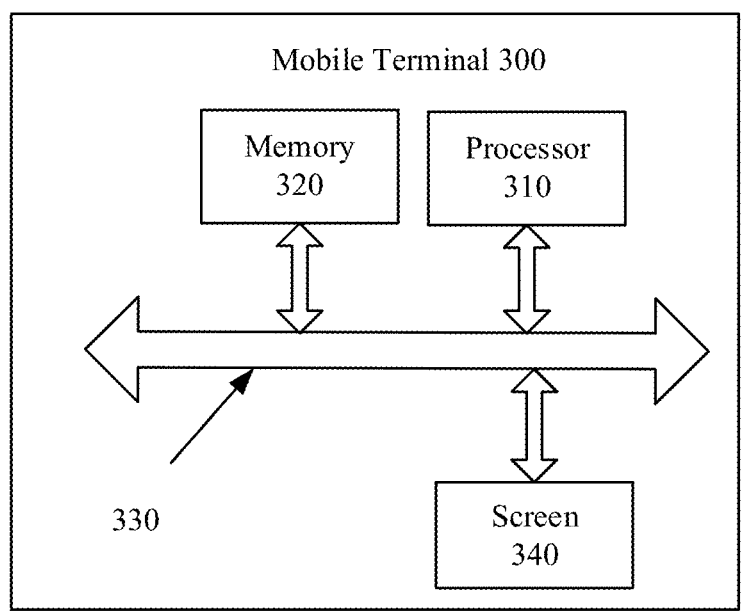
FIG. 16 is a schematic diagram of a mobile terminal according to an embodiment of the present disclosure.

FIG. 16 is a schematic diagram of an example of the mobile terminal according to an embodiment of the present disclosure. As shown in FIG. 16, in an example, the mobile terminal 300 may include a processor 310, a memory 320, a bus system 330, and at least one screen 340. Herein, the processor 310, the memory 320, and the screen 340 are connected through the bus system 330, the memory 320 is configured to store instructions, and the processor 310 is configured to execute the instructions stored in the memory 320 to control the screen 340 to display information input by a user or information provided to the user. In this example, operations of the detection module and the control module in the above-mentioned control device may be executed by the processor.

It should be understood that the processor 310 may be a central processing unit (referred to as "CPU"), and the processor 310 may also be other general-purpose processors, a digital signal processor (DSP), an application specific integrated circuit (ASIC), a field programmable gate array (FPGA) or other programmable logic devices, a discrete gate or a transistor logic device, a discrete hardware component, etc. The general-purpose processors may be microprocessors, or the processor may also be any conventional processor or the like.

The memory 320 may include a read-only memory and a random access memory, and provides instructions and data to the processor 310. A part of the memory 320 may also include a non-volatile random access memory. For example, the memory 320 may also store device type information.

In addition to a data bus, the bus system 330 may also include a power bus, a control bus, a status signal bus, and the like. However, for the sake of clear description, various buses are marked as the bus system 330 in FIG. 16.

The screen 340 may include a display panel and a touch panel. Herein, the display panel may be configured in the form of a liquid crystal display, an organic light emitting diodes or the like. The touch panel may collect user touch operations thereon or nearby, and may be implemented as resistive, capacitive, infrared or other types. In an example, the touch panel may be located over the display panel. When detecting a touch operation thereon or nearby, the touch panel may transmit the touch operation to the processor 310 to determine a type of a touch event, and then the processor 310 provides a corresponding visual output on the display panel according to the type of the touch event. In some examples, the display panel and the touch panel may be integrated to implement input and output functions. The present disclosure does not limit this.

In the implementation process, the processing performed by the mobile terminal 300 may be completed by an integrated logic circuit of hardware in the processor 310 or instructions in a form of software. That is, the steps of the method disclosed in the embodiment of the present disclosure may be embodied as being executed and completed by a hardware processor, or executed and completed by a combination of a hardware module and a software module in the processor. The software module may be located in a storage medium such as a random access memory, a flash memory, a read-only memory, a programmable read-only memory, or an electrically erasable programmable memory, a register or the like. The storage medium is located in the memory 320, and the processor 310 reads information in the memory 320, and completes the steps of the foregoing method in combination with its hardware. In order to avoid repetition, it will not be described in detail here.

In addition, an embodiment of the present disclosure also provides a computer-readable storage medium storing a computer program that, when executed by a processor, causes a processor to implement the steps of the control method provided in any of the foregoing embodiments.

A person of ordinary skill in the art can understand that all or some of the steps, system, functional modules/units of the device in the methods disclosed above may be implemented as software, firmware, hardware, and appropriate combinations thereof. In a hardware implementation, the division between functional modules/units mentioned in the above description does not necessarily correspond to the division of physical components. For example, a physical component may have multiple functions, or a function or step may be performed by several physical components cooperatively. Some or all of the components may be implemented as software executed by a processor, such as a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those of ordinary skill in the art, the term computer storage medium includes volatile and non-volatile, removable and non-removable medium implemented in any method or technology for storing information (such as computer-readable instructions, data structures, program modules, or other data). Computer storage medium include but are not limited to a random access memory (RAM), a read-only memory (ROM), an electrically erasable programmable read-only memory (EEPROM), a flash memory or other memory technologies, a compact disc read-only memory (CD-ROM), a digital video disc (DVD) or other optical disk storage, a magnetic cassette, a magnetic tape, a magnetic disk storage or other magnetic storage devices, or any other medium used to store desired information and that may be accessed by a computer. In addition, as well known to those of ordinary skill in the art, communication medium usually contain a computer-readable instruction, a data structure, a program module, or other data in a modulated data signal such as a carrier wave or other transmission mechanisms, and may include any information delivery medium.

What is claimed is:

1. A control method for a mobile terminal, applicable to a mobile terminal comprising at least one screen, the screen having at least one bending part or being foldable to form at least one bending part, the control method comprising:

detecting a holding gesture on the mobile terminal; and setting a first effective touch region and a first ineffective touch region gesture on the bending part, the first effective touch region and the first ineffective touch region corresponding to the holding gesture;

wherein after setting the first effective touch region and the first ineffective touch region corresponding to the holding gesture on the bending part, the method further comprises:

in response to a touch operation acting on the first ineffective touch region being received, ignoring the touch operation by not responding to the touch operation; and in response to a touch operation acting on the first effective touch region being received, responding to the touch operation, including performing a processing corresponding to the touch operation.

2. The method according to claim 1, wherein before detecting the holding gesture on the mobile terminal, the method further comprises:

detecting a folding angle of the screen of the mobile terminal; and in response to the folding angle satisfying an angle setting condition, determining that the screen has been folded to form the bending part.

3. The method according to claim 2, wherein the screen at least comprises a first screen unit and a second screen unit, and detecting the folding angle of the screen of the mobile terminal comprises:

detecting an angle between the first screen unit and the second screen unit.

4. The method according to claim 1, wherein detecting the holding gesture of the mobile terminal comprises:

detecting a first touch parameter of a hand and the bending part of the screen, and recognizing the holding gesture on the mobile terminal according to the first touch parameter; or, detecting a second touch parameter of a hand and the screen, and recognizing the holding gesture on the mobile terminal according to the second touch parameter.

5. The method according to claim 4, wherein the first touch parameter comprises a number of touch points on the bending part and an area of each of the touch points, and recognizing the holding gesture on the mobile terminal according to the first touch parameter comprises:

in response to a number of the touch points on the bending part being greater than zero and less than or equal to two, and one of the touch points has an area greater than an area threshold value, determining that the bending part is held on an inner side of a palm; and in response to the number of the touch points on the bending part being greater than two and less than or equal to four, and each of the touch points has an area less than or equal to the area threshold value, determining that the bending part is held on a fingertip side of fingers.

6. The method according to claim 4, wherein after detecting the holding gesture on the mobile terminal, the method further comprises:

establishing a hand shape model according to the second touch parameter; and estimating a hand shape feature according to the hand shape model; and wherein setting the first effective touch region and the first ineffective touch region corresponding to the holding gesture on the bending part comprises:

setting the first effective touch region and the first ineffective touch region corresponding to the holding gesture and matching the hand shape feature on the bending part.

7. The method according to claim 1, wherein setting the first effective touch region and the first ineffective touch region corresponding to the holding gesture on the bending part comprises:

in response to the bending part being held on an inner side of a palm, setting a touch region for a thumb on the bending part as the first effective touch region, and setting a region on the bending part except the first effective touch region as the first ineffective touch region;

in response to the bending part being held on a fingertip side of fingers, setting a touch region for an index finger on the bending part as the first effective touch region, and setting a region on the bending part except the first effective touch region as the first ineffective touch region.

8. The method according to claim 1, wherein after detecting the holding gesture on the mobile terminal, the method further comprises:

setting a second effective touch region and a second ineffective touch region corresponding to the holding gesture on a screen region facing a palm of a hand.

9. The method according to claim 8, wherein setting the second effective touch region and the second ineffective touch region corresponding to the holding gesture on the screen region facing the palm of the hand comprises:

setting a touch region for the index finger on the screen region facing the palm of the hand as the second effective touch region, and setting a region on the screen region facing the palm of the hand except the second effective touch region as the second ineffective touch region.

10. The method according to claim 8, wherein when the bending part is held on a fingertip side of fingers, the second effective touch region is interconnected with the first effective touch region.

11. A mobile terminal, comprising: at least one screen, a memory, and a processor; wherein the screen has at least one bending part or is foldable to form at least one bending part; the memory is configured to store a computer program that, when executed by the processor, causes the processor to implement a control method, the control method comprising:

detecting a holding gesture on the mobile terminal; and setting a first effective touch region and a first ineffective touch region gesture on the bending part, the first effective touch region and the first ineffective touch region corresponding to the holding gesture;

wherein after setting the first effective touch region and the first ineffective touch region corresponding to the holding gesture on the bending part, the method further comprises:

in response to a touch operation acting on the first ineffective touch region being received, ignoring the touch operation by not responding to the touch operation; and in response to a touch operation acting on the first effective touch region being received, responding to the touch operation, including performing a processing corresponding to the touch operation.

12. The mobile terminal according to claim 11, wherein before detecting the holding gesture on the mobile terminal, the method further comprises:
  detecting a folding angle of the screen of the mobile terminal; and
  in response to the folding angle satisfying an angle setting condition, determining that the screen has been folded to form the bending part.

13. The mobile terminal according to claim 12, wherein the screen at least comprises a first screen unit and a second screen unit, and detecting the folding angle of the screen of the mobile terminal comprises:
  detecting an angle between the first screen unit and the second screen unit.

14. The mobile terminal according to claim 11, wherein detecting the holding gesture of the mobile terminal comprises:
  detecting a first touch parameter of a hand and the bending part of the screen, and recognizing the holding gesture on the mobile terminal according to the first touch parameter; or,
  detecting a second touch parameter of a hand and the screen, and recognizing the holding gesture on the mobile terminal according to the second touch parameter.

15. The method according to claim 14, wherein the first touch parameter comprises a number of touch points on the bending part and an area of each of the touch points, and recognizing the holding gesture on the mobile terminal according to the first touch parameter comprises:
  in response to a number of the touch points on the bending part being greater than zero and less than or equal to two, and one of the touch points has an area greater than an area threshold value, determining that the bending part is held on an inner side of a palm; and
  in response to the number of the touch points on the bending part being greater than two and less than or equal to four, and each of the touch points has an area less than or equal to the area threshold value, determining that the bending part is held on a fingertip side of fingers.

16. The mobile terminal according to claim 14, wherein after detecting the holding gesture on the mobile terminal, the method further comprises:
  establishing a hand shape model according to the second touch parameter; and estimating a hand shape feature according to the hand shape model; and
  wherein setting the first effective touch region and the first ineffective touch region corresponding to the holding gesture on the bending part comprises:
    setting the first effective touch region and the first ineffective touch region corresponding to the holding gesture and matching the hand shape feature on the bending part.

17. The mobile terminal according to claim 11, wherein setting the first effective touch region and the first ineffective touch region corresponding to the holding gesture on the bending part comprises:
  in response to the bending part being held on an inner side of a palm, setting a touch region for a thumb on the bending part as the first effective touch region, and setting a region on the bending part except the first effective touch region as the first ineffective touch region;
  in response to that the bending part being held on a fingertip side of fingers, setting a touch region for an index finger on the bending part as the first effective touch region, and setting a region on the bending part except the first effective touch region as the first ineffective touch region.

18. A computer-readable storage medium storing a computer program that, when executed by a processor, causes the processor to implement a control method, the control method comprising:
  detecting a holding gesture on the mobile terminal; and
  setting a first effective touch region and a first ineffective touch region gesture on the bending part, the first effective touch region and the first ineffective touch region corresponding to the holding gesture;
  wherein after setting the first effective touch region and the first ineffective touch region corresponding to the holding gesture on the bending part, the method further comprises:
    in response to a touch operation acting on the first ineffective touch region being received, ignoring the touch operation by not responding to the touch operation; and
    in response to a touch operation acting on the first effective touch region being received, responding to the touch operation, including performing a processing corresponding to the touch operation.

* * * * *